Figure 1:
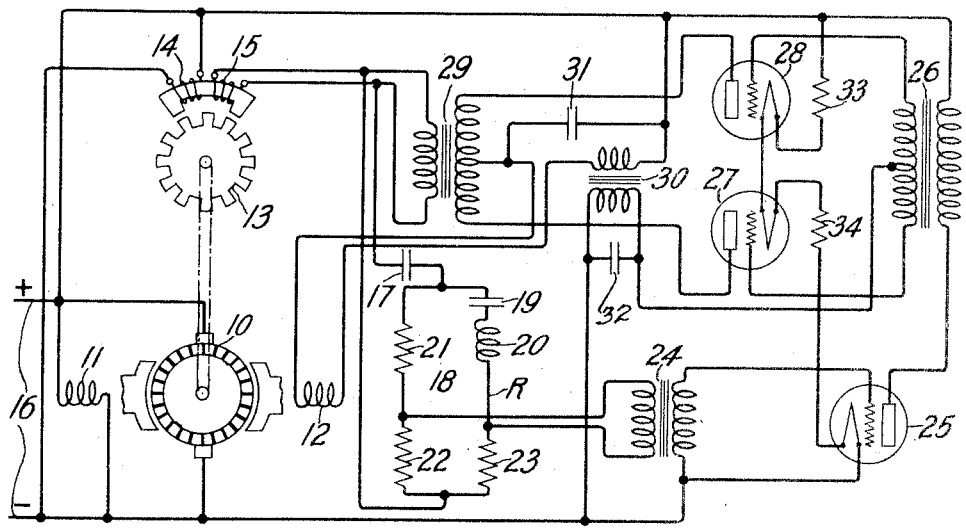

Dec. 11, 1928.

H. M. STOLLER 1,695,035

ELECTRIC REGULATOR

Filed June 21, 1927

INVENTOR:
HUGH M. STOLLER
BY E. W. Griggs
ATTORNEY

Patented Dec. 11, 1928.

1,695,035

UNITED STATES PATENT OFFICE.

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK.

ELECTRIC REGULATOR.

Application filed June 21, 1927. Serial No. 200,459.

This invention relates to electric regulators and particularly to speed regulators for electric motors.

An object of the invention is to provide a precise regulator which is economical to construct.

In a specific preferred embodiment this invention comprises a speed regulating circuit for a direct current motor. An alternating current generator is driven by the motor to obtain a wave of frequency proportional to the speed of the motor. This wave is supplied to one set of terminals of a Wheatstone bridge circuit, one arm of which is composed of a series resonant circuit tuned to the frequency of the wave generated when the motor is running at normal speed. The bridge is balanced at that frequency so that there will be 180° phase shift between the voltage outputs at the other bridge terminals for frequencies slightly above and below this value. The voltage output at these terminals of the bridge is supplied to the input circuit of a three electrode electric discharge device which obtains its space current directly from the alternating current generator so that the amplitude of the output current will be determined by the phase shift produced by the bridge circuit. When the frequency of the wave supplied to the bridge lies at one side of the frequency at which the bridge is balanced, the two voltages supplied to the discharge device will oppose each other, and when it lies on the other side of this frequency, the two voltages will aid each other, so that there will be a distinct variation in the value of the output current as the frequency of the wave passes through this point. The output current is supplied to a field winding of the motor to hold its speed at the value at which the frequency of the generated wave is the frequency at which the bridge is balanced.

In a modification of the invention the speed of an alternating current motor is regulated by supplying the space current to the saturating winding of an inductance element of the magnetic modulator type connected in series with the motor.

The feature of this invention according to which a Wheatstone bridge circuit is employed in connection with an electric discharge device for regulating speed of an electric motor, in response to variations in the magnitude of the space current may be found useful in other combinations than that specifically described herein.

Figure 2:
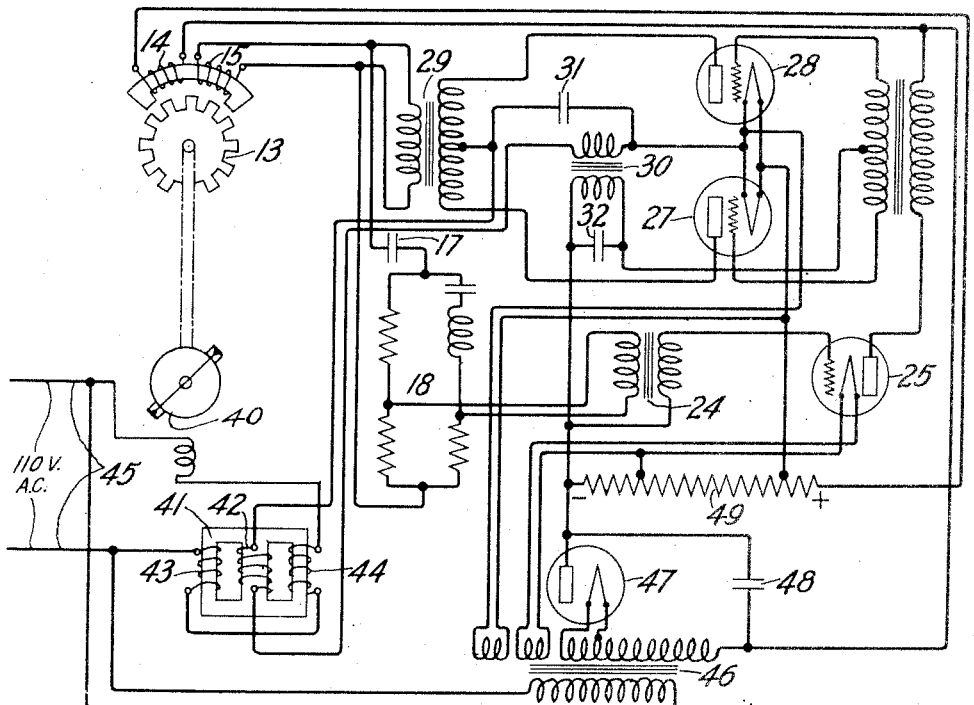

This invention can be more readily understood by reference to the following detailed description in connection with the drawing, in which:

Fig. 1 shows diagrammatically an embodiment of the invention in a regulator for a direct current motor, and Fig. 2 shows diagrammatically an embodiment of the invention in a regulator for an alternating current motor.

Referring to Fig. 1, there is shown a direct current motor 10 having a shunt field winding 11 and an aiding regulating field winding 12. The toothed rotor 13 of a small inductor type generator is driven by the motor. On the stator structure of the generator are mounted an exciting winding 14 and a generating winding 15. Exciting current is supplied to the winding 14 from the direct current mains 16, which also supply direct current to the armature winding of the motor 10.

The generating winding 15 is connected through a condenser 17 to one set of opposite terminals of a Wheatstone bridge circuit 18, which comprises a resonant circuit consisting of a condenser 19 and an inductance coil 20 connected in series in one arm, and resistances 21, 22 and 23 connected in the other arms. The other set of opposite terminals of the bridge 18 are connected to the primary winding of a transformer 24 the secondary winding of which is connected to the input of a three-electrode electric discharge device 25, the output of which is connected through a transformer 26 to the input of the electric discharge devices 27 and 28, which are connected in push-pull arrangement. Space current is supplied to the devices 27 and 28 from the generating winding 15 of the inductor generator through a transformer 29. The regulating field winding 12 is connected in the output circuit of the devices 27 and 28 in series with the primary winding of a transformer 30. A condenser 31 is connected in shunt to the regulating field winding 12 and the primary of the transformer 30 to smooth out the ripples in the space current of the devices 27 and 28. The secondary winding of the transformer 30 is shunted by a condenser 32 and connected in the input circuit of the devices 27 and 28. The cathodes of the devices 25, 27 and 28 are connected in series with each other and with the resistances 33 and 34 to the direct current mains 16 to receive heating current therefrom. Space current is also supplied to the device 25 from the mains 16. The grid connections to the devices 25, 27 and 28 are made to the negative side of the mains 16 to give the grids of the devices the proper negative biasing potentials, the potential of the grid of the device 25 being determined by the drop in its cathode and the grid potentials of the devices 27 and 28 being determined by the drop in the cathode of the device 25 and the resistance 34.

The operation of the circuit can best be understood by first considering the operation of the bridge. If the resistances of the arms 21, 22 and 23 are all the same and equal to the resistance R of the inductance coil 20 the current through any arm at frequencies varying only slightly from the resonant frequency will be given approximately by the equation:

$$I = \frac{E_0}{2R}$$

in which $E_0$ is the input voltage to the bridge, i. e. the voltage supplied by the generating winding 15.

$E_2$, the voltage across the other terminals will be $$E_2 = \frac{E_0}{2} - \left[jI\left(\omega L - \frac{1}{\omega C}\right) + IR\right]$$

where L is the inductance of the coil 20 and C is the capacity of the condenser 19.

Letting $Z = \omega L - \frac{1}{\omega C}$ and $\omega_0$ be the angular velocity at the resonant frequency so that $\omega = \omega_0 + \Delta\omega$.

$$Z = (\omega_0 + \Delta\omega)L - \frac{1}{(\omega_0 + \Delta\omega)C}$$

$$Z = \omega_0 L + \Delta\omega L - \frac{1}{\omega_0 C\left(1 + \frac{\Delta\omega}{\omega_0}\right)}$$

and substituting $1 - \frac{\Delta\omega}{\omega_0}$ for $\frac{1}{1 + \frac{\Delta\omega}{\omega_0}}$ since $\frac{\Delta\omega}{\omega_0}$ is a small quantity, $$Z = \omega_0 L + \Delta\omega L - \frac{1}{\omega_0 C}\left(1 - \frac{\Delta\omega}{\omega_0}\right)$$

and since $\omega_0 L = \frac{1}{\omega_0 C}$ $$Z = \omega_0 L + \Delta\omega L - \frac{1}{\omega_0 C} + \frac{\Delta\omega \omega_0 L}{\omega_0}$$

$$Z = 2\Delta\omega L$$

Then from the first equation:—

$$E_2 = \frac{E_0}{2} - I(R + j2\Delta\omega L)$$

or substituting for I $$E_2 = \frac{E_0}{2} - \frac{E_0}{2R}(R + j2\Delta\omega L)$$

$$E_2 = -j\Delta\omega L \frac{E_0}{R}$$

Letting $q = \frac{\omega_0 L}{R}$ $$E_2 = -j\frac{\Delta\omega}{\omega_0}E_0 q$$

Then $E_2$ is 90° out of phase with the input voltage $E_0$ and as $\Delta\omega$ varies from positive to negative the phase of $E_2$ shifts through 180°.

By inserting in series with the input terminals of the bridge a condenser 17 of large impedance compared to that of the bridge so as to obtain a 90° phase shift the voltage $E_2$ is made to be substantially in phase with the voltage from the generating winding 15 when $\Delta\omega$ is positive, i. e. when the motor is running above speed, and substantially 180° out of phase when $\Delta\omega$ is negative, i. e. when the motor is running below speed.

The circuit is adjusted to operate so that when the motor is running at normal speed the wave supplied to the bridge circuit 18 from the generating winding 15 will have a frequency which is equal to the resonant frequency of the circuit 19—20 so that there will be no voltage at the opposite terminals of the bridge 18 and consequently no voltage on the grids of the control devices 25, 27 and 28, except the negative grid biasing potential which is so chosen that with normal line voltage and normal load, the tubes 27 and 28 supply the proper amount of current to the regulating winding 12 to hold the motor speed at its normal value. Suppose now that the speed of the motor tends to increase, for example, due to an increase in the line voltage. The frequency of the wave generated by the winding 15 will then tend to increase and, as explained above, the output wave of the bridge will be substantially 90° out of phase with the input wave and substantially in phase with the wave supplied by the generating windings 15 (the correction being produced by the condenser 17). This output wave will be amplified by the device 25, and the polarity of the input transformer 26 is so adjusted that the wave supplied to the grids of the devices 27 and 28 will be substantially in phase with the wave supplied to the anodes, so that the grids are positive for the same half-wave as the plates, consequently increasing the space current and strengthening the field of the motor, thus preventing further rise in the speed.

If, on the other hand the speed of the motor tends to fall off, the output wave from the bridge 18 will lead the input wave being substantially 180° different than when the speed is above normal, thus supplying to the grids of the tubes 27 and 28 a voltage which will be negative during the half-wave in which the plates are positive, thereby reducing the field current and preventing the speed of the motor from falling off.

The transformer 30 supplies to the grid of the devices 27 and 28 an induced electromotive force which is proportional to the rate of change of the space current, thus preventing hunting. This arrangement is similar to that described in the patent to H. M. Stoller and E. R. Morton, No. 1,662,083 dated March 13, 1928.

In addition to acting as an amplifier, the device 25 serves as a voltage limiter, preventing the application of excessive voltages to the devices 27 and 28, as disclosed in the co-pending application of H. M. Stoller and E. R. Morton, Serial No. 200,460, filed June 21, 1927.

Referring to Fig. 2, there is shown a regulator for an alternating current motor 40. This regulator is similar in construction and operation to that of Fig. 1 and like parts are given the same reference numerals. In this circuit an impedance device 41 of the magnetic modulator type is employed for controlling the speed. This device comprises impedance windings 43 and 44 connected in series with the armature of the motor and a saturating winding 42 connected in the output circuit of the devices 27 and 28 in the same way that the regulating field winding 12 is connected in the circuit of Fig. 1. However, the polarity of the secondary of transformer 29 is reversed so that low speed produces an increase of current in winding 42 of reactor 41 and high speed a decrease of current. The cathodes of the devices 25, 27 and 28 are supplied with heating current from secondary windings of the transformer 46, which has its primary winding connected to the alternating current mains 45. An electric discharge rectifier 47 supplies space current to the device 25, exciting current to the winding 14 of the inductor generator and grid biasing potential to the devices 25, 27 and 28. A condenser 48 is provided for smoothing out the rectified current and the potentiometer 49 is provided for obtaining the desired values of grid biasing potential.

The impedance of the reactance 41 is thus varied by the circuit in accordance with the motor speed. Since a large D. C. current through winding 42 reduces the impedance of coils 43 and 44 the motor will get more current from the line and tend to increase its speed, and conversely a decrease of current in winding 42 will tend to decrease its speed. In actual operation an equilibrium current is established which holds the speed within close limits over a wide range of line voltage or load.

Both the direct and alternating current motors may be started in the ordinary manner without giving the regulating circuits any attention. This fact makes this type of regulating circuit very satisfactory for use where unskilled operators are employed.

What is claimed is:

1. In combination, a device having a characteristic to be regulated, means for deriving a wave of frequency proportional to said characteristic, a Wheatstone bridge having one arm in the form of a resonant circuit tuned to the frequency of the wave from said means when the characteristic of said device is normal, said bridge circuit having two sets of terminals, one of said sets of terminals being connected to said means, an electric discharge device having input and output circuits, said input circuit being connected to the other of said sets of terminals, and means connected to said output circuit and responsive to the magnitude of the space current of said device to regulate said characteristic.

2. In combination, a device having a characteristic to be regulated, means for deriving a wave of frequency proportional to said characteristic, a network having two sets of terminals conjugately related at one frequency, one of said sets of terminals being connected to said means, an electric discharge device connected to directly receive the wave from said means and to receive the output wave from the other set of terminals of said network whereby the space current of said device is controlled by the phase difference of said waves produced by said network, and means responsive to said space current for controlling said characteristic.

3. A speed regulator for an electric motor, comprising means for obtaining a wave of frequency proportional to the speed of the motor, a bridge circuit having a resonant circuit in one arm thereof and having one pair of opposite terminals connected to said means, and means responsive to the phase relation of the current from said bridge with respect to the phase of the current varying with the motor speed for controlling the speed of the motor.

4. A speed regulator for an electric motor comprising means for obtaining a wave of frequency proportional to the speed of the motor, a bridge circuit provided with a resonant arm tuned to the frequency of the wave from said means when the motor speed is normal and having one pair of opposite terminals connected to said means, an electric discharge device having input and output circuits, said input circuit being connected to the other pair of opposite terminals of said bridge circuit and the output circuit being connected to said wave obtaining means, and a regulating field winding for said motor connected in said output circuit to receive the space current of said discharge device.

5. A speed regulator for an electric motor, comprising means for obtaining a wave of frequency proportional to the speed of the motor, a bridge circuit having one pair of opposite terminals connected to said means, an electric discharge device having its space current controlled by the difference in phase of the wave supplied to said first set of terminals of said bridge by said means and the wave output at the other set of opposite terminals, and means responsive to the space current of said device for controlling the speed of the motor.

6. A speed regulator for an electric motor comprising means for obtaining a wave of frequency proportional to the speed of the motor, a bridge circuit having one pair of opposite terminals connected to said means, an electric discharge device having an input circuit connected to receive the output wave from said bridge and an output circuit connected to receive space current from said means, and means responsive to the space current of said device for controlling the speed of the motor.

7. A speed regulator for an electric motor comprising means for obtaining a wave of frequency proportional to the speed of the motor, a capacity element, a bridge circuit having one pair of opposite terminals connected through said capacity element to said means, an electric discharge device having an input circuit connected to receive the output wave from the other pair of opposite terminals of said bridge and an output circuit connected to receive space current directly from said means, and a regulating field winding for said motor connected in said output circuit.

8. A speed regulator according to claim 7 having inductive means interconnecting the input and output circuits of the electric discharge device.

9. A speed regulator for an electric motor comprising a source of electrical waves of frequency proportional to the speed of the motor, a bridge circuit having in one arm a resonant circuit tuned to the frequency of the wave produced by said source when the motor is running at normal speed to balance the bridge at that frequency, one set of opposite terminals of said bridge being connected to said source, an electric discharge device connected to receive the waves from both sets of opposite terminals of said bridge whereby the magnitude of the space current of said device is controlled by the phase characteristic of the bridge, and a regulating field winding for said motor connected to receive said space current.

10. A speed regulator for an electric motor comprising means for obtaining a wave of frequency proportional to the speed of the motor, a bridge circuit having an arm of impedance varying with frequency and balanced at the frequency of the wave produced by said means when the motor is running at normal speed, one set of opposite terminals of said bridge being connected to said means, and means connected to the other set of opposite terminals of said bridge for controlling the speed of the motor.

11. A speed regulator for an electric motor comprising means for deriving a wave of frequency proportional to the speed of the motor, a bridge circuit having one pair of opposite terminals connected to said means, and means connected to the other pair of opposite terminals of said bridge and comprising closed control circuits including thermionic tubes for controlling the speed of the motor.

12. In combination an electric motor, an electric generator driven thereby, a bridge circuit having a resonant circuit in one arm and having one pair of opposite terminals connected to said generator, said resonant arm being tuned to the frequency produced by the generator when the motor is operating at normal speed, and means comprising thermionic tube circuits connected to the other pair of opposite terminals of said bridge for controlling an operating characteristic of the motor.

13. A speed regulator for an electric motor comprising means for deriving a wave of frequency proportional to the speed of the motor, a bridge circuit having one pair of opposite terminals connected to said means, the impedance elements of each of the arms of said bridge circuit being unvarying in value, and means connected to the other pair of opposite terminals of the bridge for controlling the speed of the motor.

14. A speed regulator for an alternating current motor comprising means for obtaining a wave of frequency proportional to the speed of the motor, a capacity element, a bridge circuit having one pair of opposite terminals connected through said capacity element to said means, an electric discharge device having an input circuit connected to receive the output wave from the other pair of opposite terminals of said bridge and an output circuit connected to receive space current directly from said means, and an inductance element of the magnetic modulator type having an impedance winding connected in series with said motor and a saturating winding connected in said output circuit.

15. In a regulator system for a dynamo-electric machine, an alternating current generator operated to produce a current, the frequency of which varies according to a characteristic of said machine, a Wheatstone bridge circuit having one arm thereof in the form of a resonant circuit, one pair of opposite bridge terminals being connected to said generator, and closed control circuits connected to the other two terminals of said bridge and comprising space discharge tubes to control said generator and maintain the characteristic thereof substantially constant.

16. In a regulator system for a motor, an alternating current generator operated by said motor to produce a current, the frequency of which varies according to the motor speed, a Wheatstone bridge circuit having one arm thereof in the form of a resonant circuit, one pair of opposite terminals of said bridge being connected to said generator, and closed control circuits connected to the other two terminals of said bridge and comprising space discharge tubes to control said motor and maintain the speed thereof substantially constant.

17. In a regulator system for a motor, an alternating current generator operated by said motor to produce a current, the frequency of which varies according to the motor speed, a Wheatstone bridge circuit having one arm thereof in the form of a resonant circuit, one pair of opposite terminals of said bridge being connected to said generator, closed control circuits connected to the other two terminals of said bridge comprising space discharge devices for controlling said motor to maintain the speed thereof substantially constant, and means for controlling a space discharge device in said circuits to prevent hunting action.

18. In a regulator system for a dynamo-electric machine, means for deriving a wave of a frequency proportional to a characteristic of said machine, a Wheatstone bridge circuit having one resonant arm thereof tuned to the frequency of said drived wave when the characteristic of the machine is normal, one pair of opposite terminals of the bridge being connected to said means, a space discharge device connected to directly receive the wave from said means and having the input circuit thereof connected to the other pair of bridge terminals for varying the space current of the device in accordance with the phase difference of the waves from the bridge and the waves from said wave deriving means, and means governed by said space discharge device for controlling the characteristic of said machine.

19. In a regulator system for a motor, an alternating current generator operated by said motor to produce a current having a frequency proportional to the motor speed, a Wheatstone bridge circuit having a resonant arm tuned to the frequency of the generator current when the motor is operating at normal speed, one pair of opposite terminals of the bridge being connected to said generator, and closed circuits connected to the other two terminals of said bridge comprising space discharge devices for controlling said motor to maintain the speed thereof substantially constant.

20. In a regulator system for a motor, an alternating current generator operated by said motor to produce a current having a frequency proportional to the motor speed, a Wheatstone bridge circuit having a resonant arm tuned to the frequency of the generator current when the motor is operating at normal speed, one pair of opposite terminals of the bridge being connected to said generator, closed circuits connected to the other two terminals of said bridge comprising space discharge devices for controlling said motor to maintain the speed thereof substantially constant, and means for controlling a space discharge device in said circuits to prevent hunting action.

In witness whereof, I hereunto subscribe my name this 17th day of June, A. D. 1927.

HUGH M. STOLLER.